United States Patent
Reutlinger et al.

(10) Patent No.: US 6,907,793 B2
(45) Date of Patent: Jun. 21, 2005

(54) METHOD AND DEVICE FOR DETERMINING A TORQUE OF AN ELECTRICAL MACHINE

(75) Inventors: Kurt Reutlinger, Stuttgart (DE); Clemens Schmucker, Tamm (DE); Torsten Baumann, Eppingen-Adelshof (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 10/110,374
(22) PCT Filed: Jun. 9, 2001
(86) PCT No.: PCT/DE01/02163
§ 371 (c)(1),
(2), (4) Date: Jul. 19, 2002
(87) PCT Pub. No.: WO02/14817
PCT Pub. Date: Feb. 21, 2002

(65) Prior Publication Data
US 2003/0019302 A1 Jan. 30, 2003

(30) Foreign Application Priority Data
Aug. 17, 2000 (DE) .......................................... 100 40 112

(51) Int. Cl.$^7$ .................................................. G01L 5/24
(52) U.S. Cl. ..................................................... 73/862.28
(58) Field of Search ........................ 73/862.28, 862.191, 73/862.23, 862.29, 862.31, 862.27, 862.325

(56) References Cited

U.S. PATENT DOCUMENTS 5,773,964 A * 6/1998 Peter ............................ 322/20

* cited by examiner

Primary Examiner—Edward Lefkowitz
Assistant Examiner—Corey D. Mack
(74) Attorney, Agent, or Firm—Michael J. Striker

(57) ABSTRACT

A method and an apparatus for determining a torque ($M_{GL}$) of an electrical machine (19), in particular a generator (19) in a motor vehicle, are proposed. The method and the apparatus are characterized in that by a unit (43), the torque ($M_{GL}$) of the electrical machine (19) is ascertained as a function of a current electrical power ($P_G$) of the generator (19), a current generator rpm ($N_G$), and a current generator efficiency ($^n{}_G$).

16 Claims, 4 Drawing Sheets

METHOD AND DEVICE FOR DETERMINING A TORQUE OF AN ELECTRICAL MACHINE

BACKGROUND OF THE INVENTION

From the prior art, it is known to ascertain the torque demand of the generator via the electrical power output. The electrical power output of the generator is ascertained from the generated output voltage and the output current of the generator.

Such a direct determination of the electrical generator power is the exception, since because of the attendant high costs a direct current measurement in generators is the exception. Because of the high efficient current intensity that a modern generator furnishes, relatively expensive current measuring instruments are required. It is therefore rare for the torque demand of the generator to be taken into account in the torque balance of the engine controller.

SUMMARY OF THE INVENTION

With the method and the apparatus according to the invention, it is possible to ascertain the power and thus the load moment of the generator without measuring the output current.

A prerequisite for determining the torque of an electrical machine is that the current generator or machine efficiency be known. Mathematically formulated relationships between the instantaneous electrical power of the generator and the generator rpm with the generator efficiency are quite complicated, and the relationship among these three variables is therefore advantageously stored in memory in a performance graph. The respective current efficiency is taken from there by a control unit, as a function of the generator power and generator rpm. Such a performance graph is ascertained beforehand for this purpose and stored in a memory medium. Storing the efficiency as a function of a performance graph is advantageous because in this way, the current efficiency is ascertained especially fast. The rpm of a drive shaft of a generator, typically a crankshaft, is known in modern engine control systems. To ascertain an rpm of the generator without additional expense for equipment, such as an rpm sensor, a simple calculation is possible, with the aid of a known gear ratio between a drive shaft of the generator and the generator shaft.

Determining the current generator power can be done in various ways. If, as is usual in modern vehicles, an information network such as a CAN bus system is present, then the ON-state of the electrical consumers and thus the power demand of these electrical consumers are essentially known. If a code exchanged with this information network is evaluated, it is possible by way of comparing the ON-state with a table or a performance graph to ascertain the pulse duty factor in a simple way. If the states or the power requirements of electrical consumers are not known, then they can be taken into account by means of an assumed overall power demand. Evaluating an information code is advantageous, since the information required is essentially already present, and all that then has to be done is a calibration with a table or a performance graph.

Alternatively, it is possible to determine the generator power as a function of the exciter current of the exciter coil and of the rpm of the generator. This can in turn be done relatively simply by taking the power output by the generator from a performance graph as a function of the exciter current and the generator rpm. The otherwise complicated relationship among the generator power, exciter current and rpm is simplified as a result, since the performance graph is obtained on the basis of prior measurement of generators.

The generator rpm can also be obtained by evaluating the frequency of the output voltage, for instance. Another possibility is to use an rpm sensor. Such a sensor, like ascertaining the generator rpm by way of the frequency of the output voltage, would have the advantage that the generator rpm is independent of slippage between the rpm of the drive shaft and the generator shaft. The rpm value ascertained by these last-named method steps is therefore more accurate.

The exciter current can be ascertained simply by means of various methods. In a first variant, the exciter current is ascertained as a function of the voltage and resistance of the exciter coil. In a second variant, the exciter current is ascertained as a function of the output voltage, the resistance of the exciter coil, and a so-called pulse duty factor of the generator regulator. The output voltage of the stator coil is ascertained as the sum of the battery voltage and the voltage that drops along the charging line. Ascertaining the exciter current as a function of the output voltage of the stator coil winding is advantageous if in a vehicle recourse can be had to a so-called battery state detector, by which the battery voltage is already known. In a third variant, the exciter current is ascertained by means of the relationship among the pulse duty factor of the regulator, the electrical resistance of the exciter coil, and only the battery voltage. In contrast to the second variant, this method is advantageous because it dispenses with ascertaining the voltage drop over the charging line.

To obtain a more-accurate ascertainment of the exciter current, it is advantageous to ascertain the electrical resistance of the exciter coil as a function of the temperature of the exciter coil. The temperature dependency of the resistor of the exciter coil can be taken into account by assuming that the coolant temperature, in liquid-cooled generators, for instance, is the temperature of the exciter coil. Finally, in a simple variant, the possibility exists of assuming a previously ascertained fixed value for the operating temperature of the exciter coil and storing it in memory in the apparatus.

BRIEF DESCRIPTION OF THE DRAWINGS

The invention will be described in further detail below in terms of several exemplary embodiments in conjunction with the associated drawings and a method flow chart.

DETAILED DESCRIPTION OF THE PREFERRED EMBODIMENTS

Figure 1:
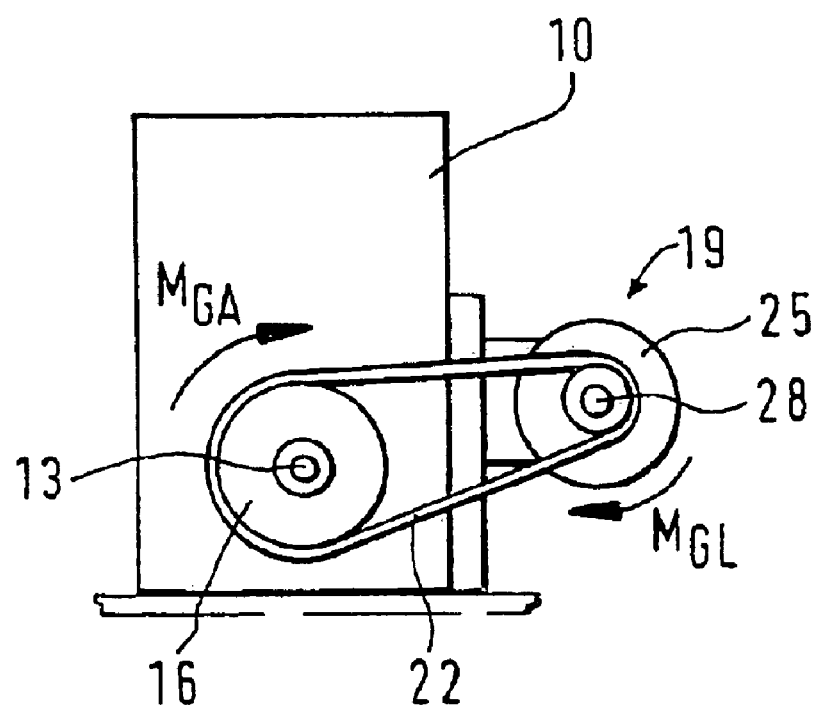
FIG. 1 is an elevation view on a driving machine, which is coupled to a generator via a traction means.

Components that are identical or function the same are identified by the same reference numerals.

In FIG. 1, a driving machine 10 is shown, which drives generator 19 via a drive shaft 13 and a drive pulley 16. To that end, the drive pulley 16 is connected to a generator pulley 25 via a belt 22. The generator pulley 25 drives a rotor shaft 28, which with an electromagnetically excited rotor 31 in a stator winding 34 generates an output voltage Us, by which an on-board electrical system 37 is supplied with electrical energy.

A load torque $M_{GL}$ acting on the generator pulley 25 is created essentially by the electrical system, that is, by the electromagnetic resistances operative there and thus by means of an electrical power $P_G$ output by the generator 19.

The load torque $M_{GL}$ is dependent on the instantaneously output electrical power $P_G$, the generator rpm $N_G$, and the efficiency $n_G$ of the generator 19. In order to ascertain the torque $M_{GA}$ exerted on the drive shaft 13 by the generator 19 via the generator pulley 25 and the belt 22 and via the drive pulley 16, a calculation by means of a gear ratio u between the drive shaft 13 and the rotor shaft 28 is necessary.

The torque $M_{GL}$ acting on the generator pulley 25 of the generator 19 is obtained from Equation 1 as a quotient of the electrical power $P_G$ of the generator 19 and the product of the number 2, the circle factor n, the rpm $N_G$ of the generator 19, and the efficiency $n_G$.

$$M_{GL}=P_G/(2*\pi*N_G*n_G) \quad \text{(Equation 1)}$$

The various possibilities for determining the torque $M_{GL}$ result from the various possibilities for determining the power $P_G$ of the generator 13.

In the first exemplary embodiment, for determining the power $P_G$ of the generator 19 in a vehicle which has a so-called information network, in this example a CAN bus system 40, a code C, which in enciphered form contains the ON-state of various electrical consumers $R_1$, $R_2$, $R_3$ and $R_4$, is evaluated in a unit 43 by means of an arithmetic and memory unit 46. The arithmetic and memory unit 46, for transmitting the code C, is connected to the CAN bus system 40 via a CAN driver 49.

Figure 2:
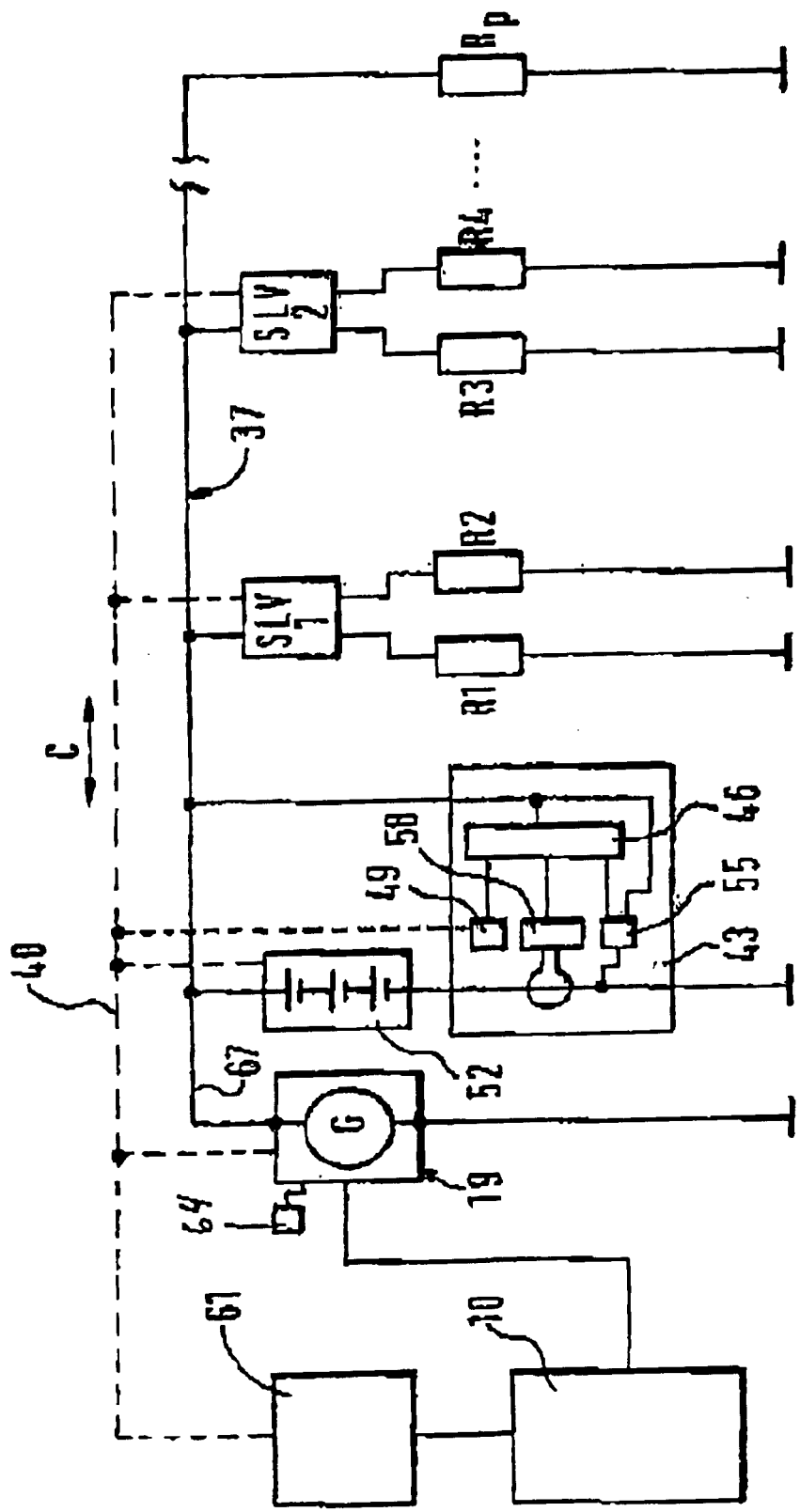
FIG. 2 is a diagram of an on-board electrical system.

FIG. 2 schematically shows the generator 19, which supplies the on-board electrical system 37 with electrical energy. The elements of the on-board electrical system 37 are a battery 52 as well as a plurality of consumers $R_1$, $R_2$, $R_3$ and $R_4$, which in this case are connected in pairs downstream of so-called signal-power distributors $SLV_1$ and $SLV_2$.

From this ON-state, the total power demand $P_{Rges}$ for various electrical consumers, such as for a drive mechanism for an air conditioner system, for a drive mechanism for a seat adjuster, or for a wiper drive mechanism, for instance, is obtained. $P_{Ri}$ is the power demand of a consumer $R_i$ in general, where i stands for a consumer and in general is an integer.

Figure 3:
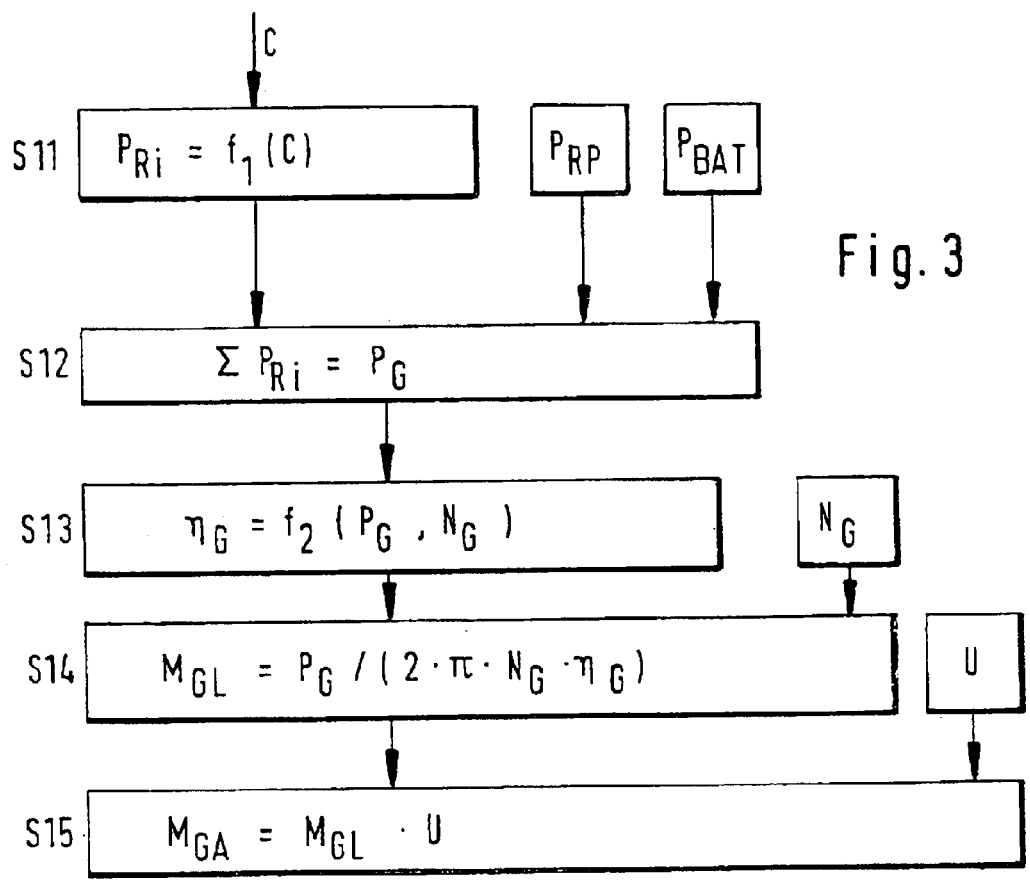
FIGS. 3, 4, 5, 6 and 7 are method flow charts for the exemplary embodiments.

In the flow chart of FIG. 3, in a first step S11 the various power components that the generator has to exert are ascertained.

The power $P_{Ri}$ of an individual consumer $R_i$ is, according to Equation 2, a function $f_1$ which is dependent on the code C. In the arithmetic and memory unit 46, the power values corresponding to one or more ON-states are ascertained by deciphering of the code C. To that end, the corresponding function $f_1$ is stored in memory in the form of a performance graph $K_1$. By a unique association of the ON-state from the code C with a power value, the power $P_{Ri}$ of an individual consumer $R_i$ is obtained.

$$P_{Ri}(C)=f_1(C). \quad \text{(Equation 2)}$$

From these individual power demands $P_{Ri}$, by addition in the arithmetic and memory unit 46, the electrical power $P_G$ to be exerted by the generator 19 is obtained; see also Equation 3, and step S12 in FIG. 3.

$$P_G = \sum_{i=1}^{n} P_{Ri} = P_{Ri}(C) + \ldots + P_{Rn}(C) \quad \text{(Equation 3)}$$

The subscript n indicates the highest number of consumers whose power $P_{Ri}$ can be ascertained from the code C. Here, in the example of FIG. 2, this means that $P_G$ is obtained as a sum by Equation 4.

$$P_G=P_{Ri}(C)+P_R2(C)+P_R3(C)+P_R4(C). \quad \text{(Equation 4)}$$

In addition to evaluating this code C, it is possible to take the power demand of electrical consumers $R_p$, whose state is not known from the code C, into account in the power balance, for instance in the form of an additional overall value $P_{RP}$; see Equation 5. This is true particularly for small consumers that do not have any CAN terminal; see FIG. 2.

$$P_G = \sum_{i=1}^{n} P_{Ri} + P_{RP} \quad \text{(Equation 5)}$$

In addition, the power $P_{BAT}$, consumed or output by a battery 43 and known from a battery state detector, can be taken into account in ascertaining the generator power $P_G$; see Equation 6.

$$P_G = \sum_{i=1}^{n} P_{Bi} + P_{RP} + P_{BAT} \quad \text{(Equation 6)}$$

The battery state detector includes a voltage measuring instrument 55 and a current measuring instrument 58. The ascertained current and voltage values are delivered to the arithmetic and memory unit 46 and added in accordance with Equation 6.

Once the generator power $P_G$ has been ascertained with the aid of the arithmetic and memory unit 46, the efficiency $n_G$ of the generator 19 can be determined with the aid of the known generator rpm $N_G$ via a performance graph $K_2$; see also Equation 7 and step S13 in FIG. 3. The performance graph $K_2$ is stored in memory in the arithmetic and memory unit 46 and has stored the efficiency $n_G$ in memory as a function of certain generator powers $P_G$ and generator rpm values $N_G$.

$n_G$ is obtained from Equation 7 as function $f_2$, which is dependent on the generator power $P_G$ and the generator rpm $N_G$.

$$n_G=f_2(P_G, N_G) \quad \text{(Equation 7)}$$

The generator rpm $N_G$ is known indirectly from a controller 61 of the driving machine 10. Via the CAN bus system, the rpm $N_A$ is transmitted to the unit 43. From a known rpm $N_A$ of the driving machine 10, the generator rpm $N_G$ is ascertained by means of the gear ratio u between the rotor shaft 28 and the drive shaft 13.

Via Equation 1 and the now-known variables comprising the electrical power $P_G$ of the generator 19, the circle factor $\pi$, the rpm $N_G$ of the generator 19, and the efficiency $n_G$, the torque $M_{GL}$ of the generator 19 can be ascertained; see FIG. 3, step S14.

The torque $M_{GA}$ of the generator 19 acting on the drive shaft 13 or to be exerted on it can be determined with the formal relationship expressed by Equation 8; see also FIG. 3, step S15.

$$M_{GA}=M_{GL}*u, \quad \text{(Equation 8)}$$

where in this example the gear ratio u is obtained from the ratio of the pulley diameters of the drive pulley 16 and the generator pulley 25.

In a second exemplary embodiment for determining the electrical power $P_G$ of the generator 19, the power $P_G$ is ascertained as a function of an exciter current $I_{ERR}$ and of the generator rpm $N_G$ from a performance graph $K_3$ that is stored in memory in the arithmetic and memory unit 46.

The power $P_G$ of the generator 19 is thus obtained by Equation 9 as follows:

$$P_G = f_3(I_{ERR}, N_G) \quad \text{(Equation 9)}$$

Thus the power $P_G$ is a function $f_3$ of the exciter current $I_{ERR}$ and of the rpm $N_G$ of the generator 13.

Figure 4:
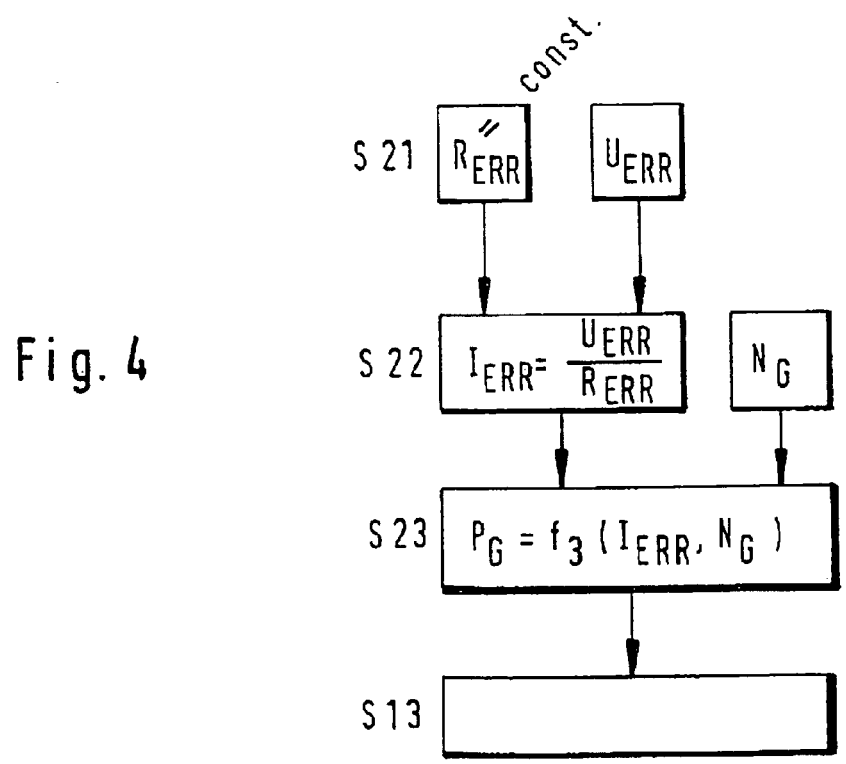

The exciter current $I_{ERR}$ is ascertained by Ohm's Law as a function of a voltage $U_{ERR}$ of an exciter coil and its ohmic resistance $R_{ERR}$; see also Equation 10 and FIG. 4, steps S21, S22 and S23.

$$I_{ERR} = U_{ERR}/R_{ERR} \quad \text{(Equation 10)}$$

The voltage $U_{ERR}$ of the exciter coil is measured in the generator 19; the resistance $R_{ERR}$ is assumed to be invariable. In this example, a resistance that is constant at an operating temperature $T_{ERR}$ of 160° C. is assumed to be the resistance $R_{ERR}$. This is an approximation of a mean temperature $T_{ERR}$ during vehicle operation.

Once the generator power $P_G$ has been determined, the method continues with step S13 from the first exemplary embodiment.

Figure 5:
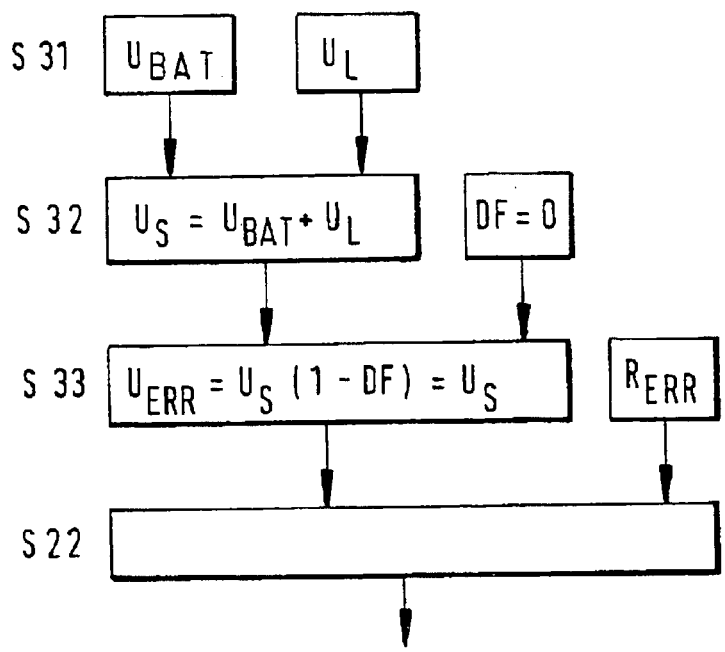

In a variant of the second exemplary embodiment, for the case where the generator 19 is at full capacity and thus a signal DF of a generator regulator 64 is equal to zero, first the stator coil voltage $U_S$ is ascertained as the sum of the battery voltage $U_{BAT}$ and a voltage drop $U_L$ over a charging line 67; see also steps S31 and S32 in FIG. 5 and Equation 11.

$$U_S = U_{BAT} + U_L \quad \text{(Equation 11)}$$

If the voltage drop $U_L$ over the charging line 67 is not measured, then this voltage drop $U_L$ is obtained from Equation 12:

$$U_L = R_L * (I_{BAT} + I_{Bi}) \quad \text{(Equation 12)}$$

as a product of the resistance of the charging line $R_L$ and the sum of a current $I_{BAT}$, which flows from or to the battery, and the currents $I_{Bi}$ to the individual consumers $R_i$.

DF is the quotient of a time $T_A$ and a sum of the time $T_E$ and a time $T_A$; see also Equation 13. DF thus characterizes the pulse duty factor of the generator regulator 64. $T_E$ is the time during which the generator regulator 64 supplies current to the exciter coil, while $T_A$ is the time during which the generator regulator 64 does not supply current to the exciter coil. This means that for a value DF=0, the exciter coil is supplied with current without interruption.

$$DF = T_A/(T_E + T_A) \quad \text{(Equation 13)}$$

The exciter coil voltage $U_{ERR}$ is then ascertained in accordance with Equation 14 as a function of the stator coil voltage $U_S$ and the signal DF.

$$U_{ERR} = U_S * (1-DF) \quad \text{(Equation 14)}$$

If, as in the second exemplary embodiment, the exciter coil resistance $R_{ERR}$ is determined or known, then the method continues with step S22 in FIG. 4.

Figure 6:
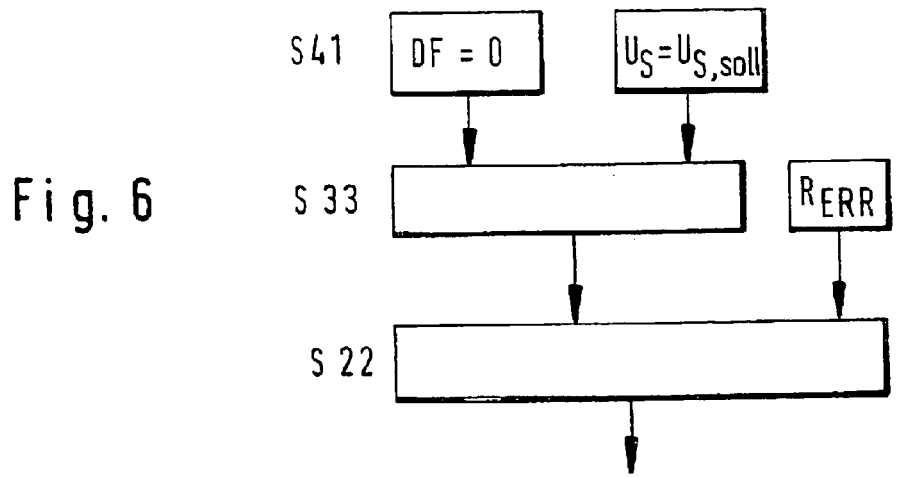

In a second variant of the second exemplary embodiment, for the case where the generator 19 is not at full capacity and thus the signal DF of the generator regulator 64 is not equal to zero, the stator coil voltage Us is assumed to be the set-point voltage $U_{S,soll}$ predetermined via the generator interface; see also FIG. 6, step 41. In this second variant of the second exemplary embodiment, the method continues with step S33 and as described there.

Figure 7:
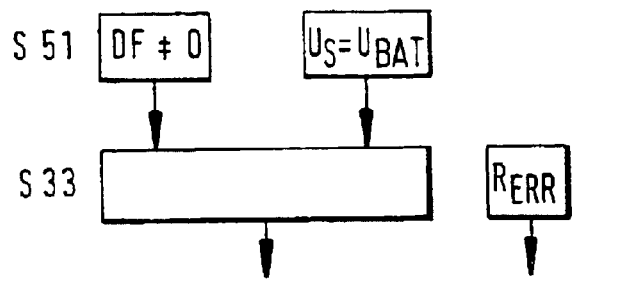

In a third variant, which is based on the second variant of the second exemplary embodiment, it is assumed for the sake of simplicity that the voltage drop $U_L$ over the charging line 67 is equal to zero, so that the battery voltage is assumed to be the stator coil voltage $U_S$; see also FIG. 7, step 51. The third variant continues with step S33 in FIG. 6.

In the second exemplary embodiment, the resistance $R_{ERR}$ of the exciter coil is assumed to be constant. Various starting values are possible for obtaining a more-realistic value for the resistance $R_{ERR}$.

If a known resistance of the exciter coil at a room temperature of 20° C. is assumed, such as $R_{ERR}$=2.6 Ω, then the resistance of the exciter coil at the assumed operating temperature can be ascertained in accordance with Equation 15.

$$R_{ERR} = R_{ERR,20° C.} * [1 + \alpha_{ERR} * (T_{ERR} - 20° C.)] \quad \text{(Equation 15)}$$

$\alpha_{ERR}$ is the temperature coefficient of the conductor material comprising the exciter coil. By means of a measured exciter coil temperature $T_{ERR}$, a more-accurate resistance value $R_{ERR}$ is obtained. In liquid-cooled generators 19, the coolant temperature can be measured. Since liquid-cooled generators 19 often have share a coolant circuit with the driving machine 10, the temperature is already known from a measurement of the coolant temperature of the driving machine 10 and can be transmitted by the controller 61 to the unit 43 over CAN.

The generator rpm $N_G$ can be obtained in other ways, as an alternative to all the exemplary embodiments and variants mentioned. For instance, this is possible by determinations of the frequency of the output voltage $U_S$, or by measurement of the rpm $N_G$ of the rotor shaft 28 or of the generator pulley 25.

Another possible way of determining the generator rpm $N_G$ is by way of an rpm of the driving machine 10, or its drive shaft 13, that drives the generator 19. Determining the generator rpm $N_G$ via a gear ratio u is imprecise, since the gear ratio u is not constant, given the variously high slippage that as a rule exists and that is dependent on operating conditions between a drive pulley 16 and the generator pulley 25. This imprecision can be taken into account in an overall way, for instance by reducing the gear ratio u, oriented to the geometries of transmission parts between the drive shaft 13 and the rotor shaft 28, by a fixed slippage value.

What is claimed is:

1. A method for determining a torque ($M_{GL}$) of an electrical machine formed as a generator (19) in a motor vehicle, comprising the following steps:
    determining a current electrical power ($P_G$), a current generator rpm ($N_G$), and a current generator efficiency ($n_G$); ascertaining the torque ($M_{GL}$) of the electical maching (19) by a unit (43) as a function of the current electrical power ($P_G$), the current generator rpm 9$N_G$), and the current generator efficiency ($^n{}_g$)($n_G$).

2. The method of claim 1, wherein the generator efficiency ($^n{}_G$)($N_G$) is stored in a performance graph ($K_2$) as a function of the electrical power ($P_G$) of the generator (19) and of the generator rpm ($N_G$) and from there is taken by the unit (43) or delivered to it.

3. The method of claim 1, wherein the current generator rpm ($N_G$) is derived, taking into account a gear ratio (u) between the generator (19) and a drive shaft (13) that drives the generator, from the current rpm ($N_A$) of the drive shaft (13).

4. The method of one of claim 1, wherein the electrical power ($P_G$) output by the generator (19) is ascertained as a sum of the known power demands ($P_{Ri}$) of individual electrical consumers ($R_i$) connected to the generator.

5. The method of claim 4, wherein the power demand ($P_{Ri}$) of at least one consumer ($R_i$) is ascertained by the unit (43) by evaluation of a code (C), which is exchanged via an information network (40), the code (C) containing information about the operating state ($Z_B$) of the at least one consumer ($R_i$).

6. The method of claim 5, wherein the power demand ($P_{Ri}$) of the at least one consumer ($R_i$) is ascertained from a performance graph ($K_i$) via the operating state ($Z_B$).

7. The method of one of claim 1, wherein the electrical power ($P_G$) output by the generator (19) is ascertained as a function of the exciter current ($I_{ERR}$) and the generator rpm ($N_G$).

8. The method of claim 7, wherein the power ($P_G$) output by the generator (19) is taken from a performance graph ($K_3$) as a function of the exciter current ($I_{ERR}$) and the generator rpm ($N_G$).

9. The method of claim 8, wherein approximately the battery voltage ($U_{BAT}$) is used by the unit (43) as a value for the electrical voltage ($U_B$) of the starter coil.

10. The method of claim 8, wherein the electrical voltage ($U_S$) of the starter coil is determined as the sum of the battery voltage ($U_{BAT}$) and the voltage drop ($U_L$) via a charging line (67) between the generator (19) and a battery (52).

11. The method of claim 8, wherein the electrical resistance ($R_{ERR}$) of the exciter winding is determined as a function of temperature.

12. The method of claim 7, wherein the exciter current ($I_{ERR}$) is ascertained either as a function of an electrical voltage ($U_{ERR}$) and a electrical resistance ($R_{ERR}$) of the exciter coil, or as a function of the electrical voltage ($U_S$) of a stator coil, a pulse duty factor ($T_A/T_A+T_E$) of a generator regulator (64) and the electrical resistance ($R_{ERR}$).

13. The method of one of claim 1, wherein a torque ($M_{GA}$) acting at a drive shaft (13) is ascertained by multiplication of the torque ($M_{GL}$) of the electrical machine (19) by a gear ratio (u) between the generator (19) and the drive shaft (13).

14. The method of claim 13, wherein the shaft (13) is an output shaft of a driving machine (10).

15. The method of claim 1, wherein the shaft (13) is a crankshaft of a driving machine.

16. An apparatus formed as a controller of a driving machine (10), for determining a torque ($M_{GA}$), operative at a crankshaft of the driving machine (10), of an electrical machine (19) formed as a generator (19) in a motor vehicle, having means for determining electrical power of the generator, having a means for determining a current generator efficiency ($n_g$), having a means for determining a torque ($M_{GL}$), and having a means for determining the torque ($M_{GA}$) operative at the crankshaft.

\* \* \* \* \*